United States Patent
Goldberg

(10) Patent No.: US 8,395,544 B2
(45) Date of Patent: Mar. 12, 2013

(54) METHOD AND SYSTEM FOR INTER-DELAY PRODUCT TEST FOR SIGNAL DEGRADATION DETECTION IN A GNSS RECEIVER

(75) Inventor: Jason Goldberg, Menlo Park, CA (US)

(73) Assignee: Broadcom Corporation, Irvine, CA (US)

( * ) Notice: Subject to any disclaimer, the term of this patent is extended or adjusted under 35 U.S.C. 154(b) by 331 days.

(21) Appl. No.: 12/902,314

(22) Filed: Oct. 12, 2010

(65) Prior Publication Data

US 2012/0001798 A1 Jan. 5, 2012

Related U.S. Application Data

(60) Provisional application No. 61/360,859, filed on Jul. 1, 2010.

(51) Int. Cl.
*G01S 19/22* (2010.01)
*H04B 1/10* (2006.01)

(52) U.S. Cl. ............... 342/357.61; 375/148; 701/478.5

(58) Field of Classification Search ............ 342/357.61; 375/148; 701/478.5
See application file for complete search history.

(56) References Cited

U.S. PATENT DOCUMENTS

| | | | | |
|---|---|---|---|---|
| 5,347,536 A | * | 9/1994 | Meehan | 375/148 |
| 6,198,765 B1 | * | 3/2001 | Cahn et al. | 375/142 |
| 7,440,493 B2 | * | 10/2008 | Pietila et al. | 375/150 |
| 7,944,961 B2 | * | 5/2011 | Simpson | 375/149 |
| 2007/0211793 A1 | * | 9/2007 | Han | 375/150 |

* cited by examiner

*Primary Examiner* — Gregory C Issing
(74) *Attorney, Agent, or Firm* — Sterne, Kessler, Goldstein & Fox PLLC

(57) ABSTRACT

A GNSS enabled communication device receives GNSS signals from GNSS satellites. The resulting GNSS baseband signals may be concurrently correlated with GNSS acquisition codes. Inter-delay products for the received GNSS signals may be generated utilizing the correlation IQ samples. The inter-delay products are utilized to calculate either an open loop or a close-loop estimate for inter-delay phase coherence of the received GNSS signals. A test statistic, generated from the inter-delay products, may be compared with a preset or dynamically determined threshold value in order to detect or declare signal degradation effects in the received GNSS signals. The early and late delays for the inter-delay phase coherence may be generalized to two or more delays. In this regard, the correlation IQ samples may be utilized to generate a correlation matrix. Variations derived from the correlation matrix may be utilized to declare or detect signal degradation effects in the received GNSS signals.

20 Claims, 6 Drawing Sheets

METHOD AND SYSTEM FOR INTER-DELAY PRODUCT TEST FOR SIGNAL DEGRADATION DETECTION IN A GNSS RECEIVER

CROSS-REFERENCE TO RELATED APPLICATIONS/INCORPORATION BY REFERENCE

This patent application makes reference to, claims priority to and claims benefit from U.S. Provisional Patent Application Ser. No. 61/360,859 filed on Jul. 1, 2010.

The above stated application is hereby incorporated herein by reference in its entirety.

FIELD OF THE INVENTION

Certain embodiments of the invention relate to communication systems. More specifically, certain embodiments of the invention relate to a method and system for inter-delay product test for signal degradation detection in a GNSS receiver.

BACKGROUND OF THE INVENTION

The Global Positioning System (GPS), the Global Orbiting Navigation Satellite System (GLONASS), and the satellite navigation system GALILEO are three examples of Global Navigation Satellite Systems (GNSSs). GNSS is based on an earth-orbiting constellation of a plurality of satellites each broadcasting its precise location and ranging information. From any location on or near the earth, GNSS receivers may normally determine their navigation information by receiving satellite broadcast signals from a plurality of satellites. Various GNSS measurements such as pseudorange, carrier phase, and/or Doppler may be used by GNSS receivers to calculate navigation information such as GNSS receiver positions, velocity, and time.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for inter-delay product test for signal degradation detection in a GNSS receiver, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for inter-delay product test for signal degradation detection in a GNSS receiver. In various embodiments of the invention, a GNSS enabled communication device may receive GNSS satellite signals from a plurality of GNSS satellites. The GNSS enabled communication device may be operable to concurrently correlate corresponding GNSS baseband signals of the received GNSS signals with a plurality of GNSS acquisition codes. The GNSS enabled communication device may be operable to utilize the resulting correlation IQ samples to generate a plurality of inter-delay products. The inter-delay products may be utilized for multipath detection for the received GNSS signals. The GNSS enabled communication device may utilize the inter-delay products to generate either an open loop or a close-loop estimate for inter-delay phase coherence of the received GNSS signals. A phase lock loop (PLL) method may be utilized to calculate the inter-delay phase coherence estimate. The inter-delay phase coherence estimate may be utilized to generate a test statistic selected or utilized for the multipath detection on the received GNSS signals. Signal degradation effects may be declared in the received GNSS signals if the selected test statistic is greater than a threshold value, which may be a preset or dynamically determined threshold value. In an exemplary embodiment of the invention, the GNSS enabled communication device may generalize the early and late delays to two or more delays for multipath detection. In this regard, the correlation IQ samples may be utilized to generate a correlation matrix. The GNSS enabled communication device may coherently sum the correlation matrix over an observation interval of the received GNSS signals. The GNSS enabled communication device may be operable to compare or evaluate the variations over the summed correlation matrix with a threshold value, which may be a preset or dynamically determined threshold value. Signal degradation effects may be declared in the received GNSS signals if the variations are greater than the threshold value.

Figure 1:
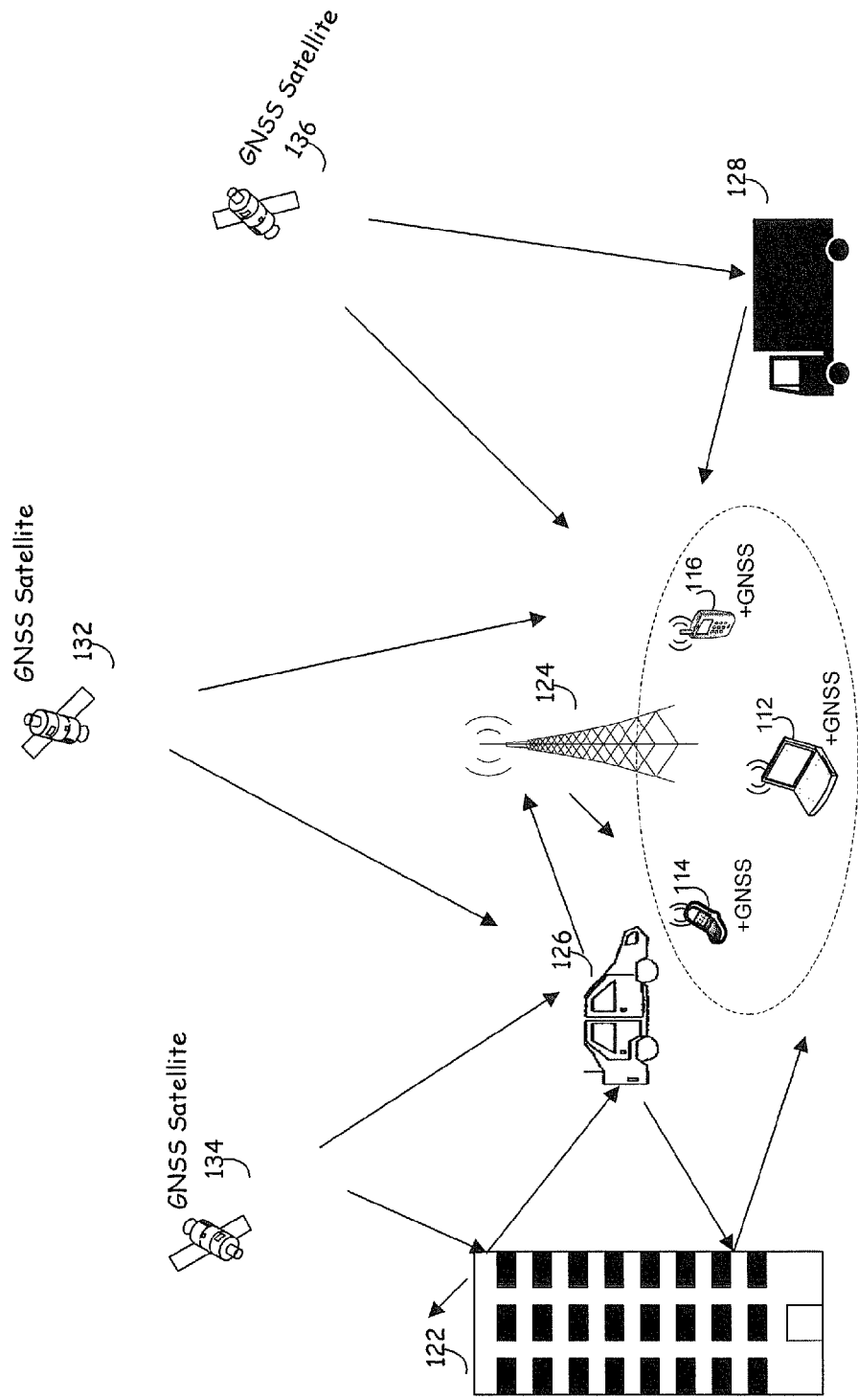
FIG. 1 is a diagram illustrating an exemplary Global Navigation Satellite Systems (GNSS) communication system that is operable to detect signal degradation in received GNSS signals, in accordance with an embodiment of the invention.

FIG. 1 is a diagram illustrating an exemplary Global Navigation Satellite Systems (GNSS) communication system that is operable to detect signal degradation in received GNSS signals, in accordance with an embodiment of the invention. Referring to FIG. 1, there is shown a GNSS communication system 100. The GNSS communication system 100 comprises a plurality of GNSS enabled communication devices, of which GNSS enabled communication devices 112-116 are illustrated, a plurality of multipath reflectors such as multipath reflectors 122-128, and a plurality of GNSS satellites, of which GNSS satellites 132-136 are displayed.

A GNSS enabled communication device such as the GNSS enabled communication device 112 may comprise suitable logic, circuitry, interfaces and/or code that are operable to track and receive GNSS satellite signals from the GNSS satellites 132-136, for example. The GNSS enabled communication device 112 may be operable to process the received GNSS signals for GNSS measurements such as range, range-rate, and/or carrier phase. The GNSS enabled communication device 112 may utilize the GNSS measurements to provide various navigation solutions comprising velocity, position fix and/or time, for example.

With reflections by surrounding objects such as, for example, the multipath reflectors 122-128, the received GNSS signals may comprise direct as well as multipath GNSS signals. Multipath GNSS signals, because of their unpredictable and varying nature, may cause multipath fading and/or carrier phase differences in the received GNSS signals, and may significantly affect the quality of the GNSS measurements.

In various exemplary embodiments of the invention, the GNSS enabled communication device 112 may be configured to concurrently evaluate the received GNSS signals at different time delays. In this regard, the GNSS enabled communication device 112 may be operable to concurrently perform correlation processes on the received GNSS signals at different time delays. For example, the GNSS enabled communication device 112 may concurrently correlate the received GNSS signals with a set of reference GNSS acquisition codes each generated for a different time delay. The resulting correlation data, also referred to as IQ samples, may be utilized to generate a plurality of inter-delay products, $c_E(t)$, $c_p(t)$ and $c_L(t)$, where $c_E(t)$, $c_p(t)$ and $c_L(t)$ may represent early, prompt and late IQ samples at time instant t, respectively. An inter-delay product at the time instant t may be generated by $c_E(t) c_L^*(t)$, where $c_L^*(t)$ is the complex conjugate of $c_L(t)$. The inter-delay product, $c_E(t) c_L^*(t)$, may be utilized to estimate an inter-delay phase coherence of the received GNSS signals. In this regard, an open-loop or closed-loop estimate of inter-delay phase coherence of the received GNSS signals may be calculated. An open-loop estimate of inter-delay phase coherence for the received GNSS signals refers to an inter-delay phase coherence estimate that may be calculated utilizing a previous finite number of IQ samples of the received GNSS signals. A closed-loop estimate of inter-delay phase coherence for the received GNSS signals refers to an inter-delay phase coherence estimate that may be calculated utilizing previous infinite number of IQ samples of the received GNSS signals.

In instances where an open-loop estimate of inter-delay phase coherence is implemented for the received GNSS signals, the inter-delay product, $c_E(t)c_L^*(t)$, may be coherently average summed over an observation interval of the received GNSS signals to provide an open-loop inter-delay phase coherence estimate for the received GNSS signals. The observation interval for the received GNSS signals refers to as a time interval within which carrier phase of the received GNSS signals may be, on average, predictable.

The open-loop inter-delay phase coherence estimate may be utilized as an open-loop multipath test statistic to detect multipath effects in the received GNSS signals. In instances where the inter-delay phase coherence estimate is greater than and/or equal to a multipath threshold value, which may be a preset or dynamically determined threshold value, the GNSS enabled communication device 112 may declare or indicate the presence of signal degradation effects in the received GNSS signals. Otherwise, no signal degradation effects in the received GNSS signals may be declared or indicated. For weaker signals and narrow correlators, an open-loop multipath test statistic may be generated or utilized for the received GNSS signals by removing the prior known early-late noise cross-correlation from the inter-delay phase coherence estimate. In instances where the open-loop multipath test statistic is greater than and/or equal to a multipath threshold value, which may be a preset or dynamically determined threshold value, the GNSS enabled communication device 112 may declare signal degradation effects in the received GNSS signals. Otherwise, no signal degradation effects in the received GNSS signals may be declared or indicated.

In instances where a closed-loop estimate of inter-delay phase coherence is implemented for the received GNSS signals, the corresponding phase for the early IQ sample $c_E(t)$ and the late IQ sample $c_L(t)$ at time instant t may be estimated utilizing a phase lock loop (PLL) method. A PLL is a feedback control system that tracks a given reference signal and locks the given reference signal onto a received signal. The PLL-based early and late delays, denoted as, $\hat{\theta}_E^{PLL}$ and $\hat{\theta}_L^{PLL}$, respectively, may be utilized to generate a closed-loop multipath test statistic such as, for example, $$\left|\frac{1}{N}\sum_{t=1}^{N} \hat{\theta}_L^{PLL}(t) - \hat{\theta}_E^{PLL}(t)\right|^\alpha \text{ and } \frac{1}{N}\sum_{t=1}^{N} \left|\hat{\theta}_L^{PLL}(t) - \hat{\theta}_E^{PLL}(t)\right|^\alpha,$$

where the parameter N is the number of IQ samples within the observation interval for the received GNSS signals, and the parameter $\alpha$ is a preset value. In instances where the closed-loop multipath test statistic is greater than and/or equal to a multipath threshold value, which may be a preset or dynamically determined threshold value, the GNSS enabled communication device 112 may declare signal degradation effects in the received GNSS signals. Otherwise, no signal degradation effects in the received GNSS signals may be declared or indicated.

Depending on actual channel conditions, the noise, n(t), may be removed from the inter-delay product, $c_E(t)c_L^*(t)$, by $y(t)=c_E(t)c_L^*(t)-E(n_E(t)n_L^*(t))$, where $n_L^*(t)$ is the complex conjugate value of late IQ sample noise at time instant t and E is an expectation value operator. The phase for y(t) and ELP(t) may be estimated via a PLL method to track the early and late delays. The resulting ELP(t) may be utilized to generate a closed-loop multipath test statistic such as, for example, $$\frac{1}{N}\sum_{\tau=0}^{N-1} |ELP(t-\tau)|^\alpha \text{ or } \left|\frac{1}{N}\sum_{\tau=0}^{N-1} ELP(t-\tau)\right|^\alpha,$$

where the parameter N is the number of IQ samples within the observation interval for the received GNSS signals, and the parameter $\alpha$ is a preset value. In instances where the closed-loop multipath test statistic is greater than and/or equal to a multipath threshold value, the GNSS enabled communication device 112 may declare or indicate the presence of signal degradation effects in the received GNSS signals. Otherwise, no signal degradation effects in the received GNSS signals may be declared or indicated.

In various exemplary embodiments of the invention, the early and late delays may be generalized to two or more delays for multipath detection. In this regard, the IQ samples may be utilized to generate an inter-delay vector. The inter-delay matrix of the inter-delay vector may be coherently average summed over an observation interval of the received GNSS signals to generate a correlation matrix. In an exemplary embodiment of the invention, the GNSS enabled communication device 112 may be operable to perform a joint test on variations over the correlation for signal degradation detection in the received GNSS signals. In this regard, variations in magnitude and/or carrier phase over diagonal and off-diagonal elements of the correlation matrix may be evaluated or compared. In instances where variations in magnitude and/or carrier phase between the diagonal and off-diagonal elements of the correlation matrix are greater than a threshold value, the GNSS enabled communication device 112 may declare signal degradation effects in the received GNSS signals. Otherwise, no signal degradation effects in the received. GNSS signals may be declared.

A GNSS satellite such as the GNSS satellite 132 may comprise suitable logic, circuitry, interfaces and/or code that is operable to provide satellite navigational information to various GNSS receivers on earth. The GNSS receivers, which comprise GPS, GALILEO and/or GLONASS receivers, are integrated within or externally coupled to GNSS capable communication devices such as the GNSS enabled communication devices 112 through 116. The GNSS satellite 132 may be operable to broadcast its own ephemeris periodically, for example, once every 30 seconds. The broadcast ephemeris may be transmitted at a rate of, for example, 50 bits per second, taking 18 seconds in all for a complete ephemeris transmission. The broadcast ephemeris may be utilized to calculate navigation information such as, for example, position, velocity, and clock information of the GNSS receivers. The GNSS satellite 132 may be operable to update ephemeris, for example, every two hours. The broadcast ephemeris may be valid for a limited time period such as, for example, 2 to 4 hours into the future (from the time of broadcast).

In an exemplary operation, the GNSS enabled communication device 112 may receive GNSS signals from the GNSS satellites 132-136. The received GNSS signals may comprise direct and reflected GNSS signals. The received GNSS signals may be concurrently correlated with a set of local reference GNSS acquisition codes each of which is generated with a different time delay. The resulting IQ samples may be utilized to generate a plurality of inter-delay products. The GNSS enabled communication device 112 may be operable to utilize the inter-delay products to calculate either an open loop or a close loop estimate of inter-delay phase coherence for the received GNSS signals. An open-loop multipath test statistic or a closed-loop multipath test statistic may be generated utilizing the corresponding estimate of inter-delay phase coherence for multipath detection. In an embodiment of the invention, the GNSS enabled communication device 112 may be operable to generalize the early and late delays to two or more delays for multipath detection. In this regard, the IQ samples may be utilized to generate an inter-delay vector utilizing the IQ samples. A correlation matrix may be calculated or generated by coherently summing the inter-delay matrix of the inter-delay vector over an observation interval of the received GNSS signals. Variations in magnitude and/or carrier phase over diagonal and off-diagonal elements of the correlation matrix may be jointly evaluated or tested to detect signal degradation effects such as multi-path in the received GNSS signals.

Figure 2:
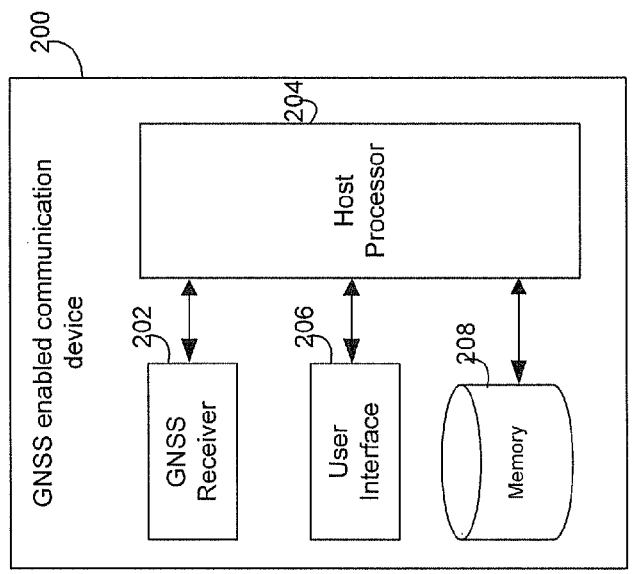
FIG. 2 is a block diagram illustrating an exemplary GNSS enabled communication device that is operable to detect signal degradation of received GNSS signals, in accordance with an embodiment of the invention.

FIG. 2 is a block diagram illustrating exemplary GNSS enabled communication device that is operable to detect signal degradation in received GNSS signals, in accordance with an embodiment of the invention. Referring to FIG. 2, there is shown a GNSS enabled communication device 200. The GNSS enabled communication device 200 may comprise a GNSS receiver 202, a processor 204, a user interface 206, and a memory 208.

The GNSS receiver 202 may comprise suitable logic, circuitry, interfaces and/or code that may be operable to receive GNSS signals from a plurality of visible GNSS satellites. The received GNSS signals may comprise satellite navigation information such as ephemeris and/or clock model, which may be utilized accurately determining related satellite orbits and calculating navigation information such as, for example, a position fix and/or velocity of the GNSS receiver 202. The received GNSS signals may comprise direct GNSS signals and multi-path GNSS signals caused by surrounding objects such as the multipath reflectors 122-128.

In various exemplary embodiments of the invention, the GNSS receiver 202 may be operable to concurrently perform correlation processes at different time delays on the received GNSS signals. The GNSS receiver 202 may be operable to utilize the resulting IQ samples to generate a plurality of inter-delay products. The early, prompt and late IQ samples at time instant t may be represented as $c_E(t)$, $c_p(t)$ and $c_L(t)$, respectively. The inter-delay products $c_E(t)c_L^*(t)$ may be utilized to calculate the estimate of an inter-delay phase coherence for the received GNSS signals. Depending on the implementation, the GNSS receiver 202 may be operable to calculate an open-loop or closed-loop estimate of inter-delay phase coherence for the received GNSS signals.

In various exemplary embodiments of the invention, in instances where an open-loop estimate of inter-delay phase coherence is implemented for the received GNSS signals, the inter-delay product, $c_E(t)c_L^*(t)$, may be coherently average summed over an observation interval of the received GNSS signals to provide an open-loop inter-delay phase coherence estimate of the received GNSS signals. The GNSS receiver 202 may utilize the open-loop inter-delay phase coherence estimate as an open-loop multipath test statistic for detecting multipath effects in the received GNSS signals. In instances where the inter-delay phase coherence estimate is greater than and/or equal to a multipath threshold value, which may be a preset or dynamically determined threshold value, the GNSS receiver 202 may declare signal degradation effects in the received GNSS signals. Otherwise, no signal degradation effects in the received GNSS signals may be declared or indicated. Depending on channel conditions and device capabilities, for example, for weaker signals and narrow correlators, the GNSS receiver 202 may generate an open-loop multipath test statistic by removing the prior known early-late noise cross-correlation from the inter-delay phase coherence estimate. In instances where the open-loop multipath test statistic is greater than and/or equal to a multipath threshold value, which may be a preset or dynamically determined threshold value, the GNSS receiver 202 may declare or indicate the presence of signal degradation effects in the received GNSS signals. Otherwise, no signal degradation effects in the received GNSS signals may be declared or indicated.

In various exemplary embodiments of the invention, in instances where a closed-loop estimate of inter-delay phase coherence is implemented for the received GNSS signals, the GNSS receiver 202 may be operable to apply a phase lock loop (PLL) method on the early IQ sample $c_E(t)$ and the late IQ sample $c_L(t)$ to estimate corresponding phases, $\hat{\theta}_E^{PLL}$ and $\hat{\theta}_L^{PLL}$. The GNSS receiver 202 may then generate a closed-loop multipath test statistic such as, for example, $$\left| \frac{1}{N} \sum_{t=1}^{N} \hat{\theta}_L^{PLL}(t) - \hat{\theta}_E^{PLL}(t) \right|^\alpha \text{ or } \frac{1}{N} \sum_{t=1}^{N} \left| \hat{\theta}_L^{PLL}(t) - \hat{\theta}_E^{PLL}(t) \right|^\alpha,$$

where the parameter N is the number of IQ samples within the observation interval for the received GNSS signals, and the parameter α is a preset value. In instances where the closed-loop multipath test statistic is greater than and/or equal to a multipath threshold value, which may be a preset or dynamically determined threshold value, the GNSS receiver 202 may declare signal degradation effects in the received GNSS signals. Otherwise, no signal degradation effects in the received GNSS signals may be declared or indicated.

In various exemplary embodiments of the invention, in instances where a noise level associated with channels is high or is not negligible, the GNSS receiver 202 may be operable to track or estimate the phase difference of early delays and late delays. More specifically, the phase of $y(t)=c_E(t)c_L^*(t)-E(n_E(t)n_L^*(t))$, where $n_L^*(t)$ is the complex conjugate value of late IQ sample noise at time instant t and E is an expectation value operator, may be estimated or calculated via a PLL method to track the early and late delay differences, ELP(t). The GNSS receiver 202 may utilize the early and late delay differences to generate a closed-loop multipath test statistic such as, for example, $$\frac{1}{N} \sum_{\tau=0}^{N-1} |ELP(t-\tau)|^\alpha \text{ or } \left| \frac{1}{N} \sum_{\tau=0}^{N-1} ELP(t-\tau) \right|^\alpha,$$

where the parameter N is the number of IQ samples within the observation interval for the received GNSS signals, and the parameter α is a preset value. In instances where the closed-loop multipath test statistic is greater than and/or equal to a multipath threshold value, which may be a preset or dynamically determined threshold value, the GNSS receiver 202 may declare signal degradation effects in the received GNSS signals. Otherwise, no signal degradation effects in the received GNSS signals may be declared or indicated.

In various exemplary embodiments of the invention, the GNSS receiver 202 may be operable to generalize the early and late delays to two or more delays for multipath detection. In this regard, the IQ samples may be utilized to generate or generate an inter-delay vector. The generated inter-delay vector may be multiplied with its own complex transpose vector to generate an inter-delay matrix. The GNSS receiver 202 may be operable to coherently sum the inter-delay matrix over an observation interval of the received GNSS signals to generate a correlation matrix. Signal degradation effects such as multi-path in the received GNSS signals may be jointly tested over the correlation matrix. For example, the GNSS receiver 202 may be operable to jointly evaluate or test variations in magnitude and/or carrier phase over diagonal and off-diagonal elements of the correlation matrix. The GNSS receiver 202 may declare signal degradation effects in the received GNSS signals if variations in magnitude and/or carrier phase over the diagonal elements and the off-diagonal elements of the correlation matrix are greater than a threshold value, which may be a preset or dynamically determined threshold value. Otherwise, no signal degradation effects in the received GNSS signals may be detected, indicated or declared. The GNSS receiver 202 may communicate signal degradation detection information to the host processor 204.

The host processor 204 may comprise suitable logic, circuitry, interfaces and/or code that may be operable to process GNSS signals from the GNSS receiver 202. The host processor 204 may be operable to extract navigational information from the received GNSS signals to determine navigational information such as a position fix associated the GNSS enabled communication device 200.

The user interface 206 may comprise suitable logic, circuitry, interfaces, and/or code that may enable presentation of navigation information to users. The navigation information may be presented graphically, aurally, in response to user input requests for a navigation update via, for example, a keyboard, a keypad, a thumbwheel, a mouse, touch screen, audio, a trackball and/or other input method.

The memory 208 may comprise suitable logic, circuitry, interfaces, and/or code that may enable storing of information such as executable instructions and data that may be utilized by the host processor 204. The executable instructions may comprise algorithms that may be applied to extract ephemeris from received GNSS broadcast navigation signals and to calculate a navigation solution from the extracted ephemeris. The data may comprise the determined position fix associated with the GNSS enabled communication device 200. The memory 208 may comprise RAM, ROM, low latency non-volatile memory such as flash memory and/or other suitable electronic data storage.

In an exemplary operation, the GNSS receiver 202 may be operable to receive GNSS signals from the GNSS satellites 132-136, for example. The GNSS receiver 202 may concurrently perform correlation processes on the received GNSS signals utilizing a set of reference GNSS acquisition codes each generated with a different time delay. The resulting IQ samples may be utilized to generate a plurality of inter-delay products. The GNSS receiver 202 may be operable to utilize the inter-delay products to generate either an open loop or a close loop estimate of inter-delay phase coherence for the received GNSS signals. The GNSS receiver 202 may be operable to utilize the inter-delay products to calculate either an open loop or a close loop estimate of inter-delay phase coherence for the received GNSS signals. An open-loop multipath test statistic or a closed-loop multipath test statistic may be generated utilizing the corresponding estimate of inter-delay phase coherence for multipath detection. In an embodiment of the invention, the IQ samples at different time delays may also be utilized to generate an inter-delay vector. The GNSS receiver 202 may coherently sum the inter-delay matrix of the inter-delay vector over an observation interval of the received GNSS signals to generate a correlation matrix. The GNSS receiver 202 may be operable to jointly test variations in magnitude and/or carrier phase over the diagonal and off-diagonal elements of the correlation matrix to detect signal degradation effects such as multi-path in the received GNSS signals.

Figure 3:
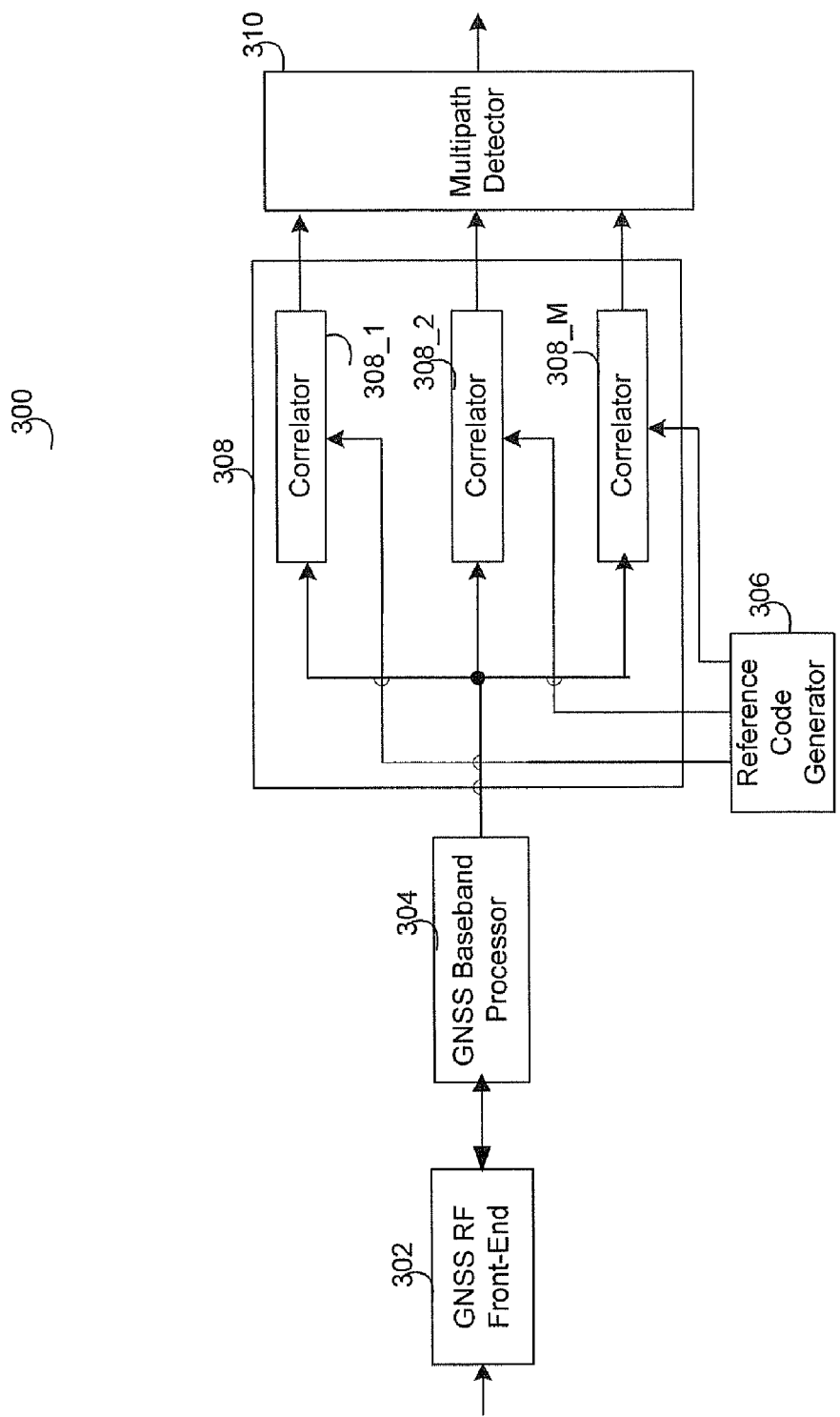
FIG. 3 is a block diagram illustrating an exemplary GNSS receiver that is operable to generate a correlation matrix for signal degradation detection of received GNSS signals, in accordance with an embodiment of the invention.

FIG. 3 is a block diagram illustrating exemplary GNSS receiver that is operable to generate a correlation matrix for signal degradation detection in received GNSS signals, in accordance with an embodiment of the invention. Referring to FIG. 3, there is shown a GNSS receiver 300. The GNSS receiver 300 may comprise a GNSS RF front-end 302, a GNSS baseband processor 304, a reference code generator 306, a correlation unit 308, and a signal degradation detector 310.

The GNSS RF front-end 302 may comprise suitable logic, circuitry, interfaces, and/or code that may be operable to receive GNSS signals and convert the received GNSS signals into GNSS baseband signals. The GNSS RF front-end 302 may be operable to communicate the converted GNSS baseband signals to the GNSS baseband 304 for further GNSS baseband processing.

The GNSS baseband 304 may comprise suitable logic, circuitry, interfaces and/or code that are operable to manage and/or control operations of the GNSS RF front-end 302. The GNSS baseband 304 may process GNSS baseband signals from the GNSS RF front-end 302 performing functions such as clock recovery, channel selection, demodulation, and/or decoding for GNSS measurements. The GNSS baseband 304 may be operable to communicate the GNSS measurements to the host processor 204 for navigation solutions such as velocity, position fix and/or time. In an exemplary embodiment of the invention, the GNSS baseband 304 may be operable to communicate the processed GNSS baseband signals to the correlation unit 308 for signal degradation detection in the received GNSS signals.

The reference code generator 306 may comprise suitable logic, circuitry, interfaces and/or code that are operable to generate a plurality of reference GNSS acquisition codes at different time delays.

The correlation unit 308 may comprise suitable logic, circuitry, interfaces and/or code that are operable to concurrently perform correlation processes on signals from the GNSS baseband 304. In this regard, the correlators 308_1 through 308_M each may correlate the received signals with a different reference GNSS acquisition code from the reference code generator 306. The resulting correlation data, IQ samples, may be provided to the signal degradation detector 310 for signal degradation detection.

The signal degradation detector 310 may comprise suitable logic, circuitry, interfaces and/or code that may be operable to IQ samples from the correlation unit 308 to generate a plurality of inter-delay products. The signal degradation detector 310 may be operable to utilize the inter-delay products to generate either an open loop or a close-loop estimate of inter-delay phase coherence for the received GNSS signals. The open-loop or closed-loop estimate of inter-delay phase coherence may be utilized to generate various multipath test statistic for multipath detection. For example, assume $c_E(t)$, $c_P(t)$ and $c_L(t)$, represent early, prompt and late IQ samples at time instant t, respectively. The signal degradation detector 310 may utilize the inter-delay products $c_E(t) c_L^*(t)$ to estimate an inter-delay phase coherence of the received GNSS signals. Depending on implementation, the signal degradation detector 310 may be operable to calculate an open-loop or closed-loop estimate of inter-delay phase coherence for the received GNSS signals. For example, in instances where an open-loop estimate of inter-delay phase coherence is implemented for the received GNSS signals, an open-loop inter-delay phase coherence estimate may be calculated by $$\left| \angle \frac{1}{N} \sum_{t=1}^{N} c_E(t) c_L^*(t) \right|,$$

where $c_L^*(t)$ is the complex conjugate of $c_L(t)$, and the parameter N is the number of IQ samples within the observation interval for the received GNSS signals. The signal degradation detector 310 may utilize the calculated open-loop inter-delay phase coherence estimate as an open-loop multipath test statistic for multipath detection on the received GNSS signals. In instances where the calculated inter-delay phase coherence estimate is greater than and/or equal to a multipath threshold value, which may be a preset or dynamically determined threshold value, the signal degradation detector 310 may declare or indicate the presence of signal degradation effects in the received GNSS signals. Otherwise, no signal degradation effects in the received GNSS signals may be declared or indicated. For weaker signals and narrow correlators, an open-loop multipath test statistic may be generated by removing the prior known early-late noise cross-correlation from the inter-delay phase coherence estimate. In instances where the open-loop multipath test statistic is greater than and/or equal to a multipath threshold value, which may be a preset or dynamically determined threshold value, the signal degradation detector 310 may declare or indicate the presence of signal degradation effects in the received GNSS signals. Otherwise, no signal degradation effects in the received GNSS signals may be declared.

In various exemplary embodiments of the invention, in instances where a closed-loop estimate of inter-delay phase coherence is implemented for the received GNSS signals, a phase lock loop (PLL) phase method may be utilized to track the early and late delays, $\hat{\theta}_E^{PLL}$ and $\hat{\theta}_L^{PLL}$, for the received GNSS signals. The signal degradation detector 310 may utilize $\hat{\theta}_E^{PLL}$ and $\hat{\theta}_L^{PLL}$ to generate a closed-loop multipath test statistic such as, for example, $$\left| \frac{1}{N} \sum_{t=1}^{N} \hat{\theta}_L^{PLL}(t) - \hat{\theta}_E^{PLL}(t) \right|^\alpha \text{ or } \frac{1}{N} \sum_{t=1}^{N} \left| \hat{\theta}_L^{PLL}(t) - \hat{\theta}_E^{PLL}(t) \right|^\alpha,$$

where the parameter N is the number of IQ samples within the observation interval for the received GNSS signals, and the parameter $\alpha$ is a preset value. In instances where the closed-loop multipath test statistic is greater than and/or equal to a multipath threshold value, which may be a preset or dynamically determined threshold value, the signal degradation detector 310 may declare or indicate the presence of signal degradation effects in the received GNSS signals. Otherwise, no signal degradation effects in the received GNSS signals may be declared or indicated.

For a noisy channel condition, the signal degradation detector 310 may be operable to estimate the phase differences between the early and late delays by applying a PLL method on $y(t)=c_E(t)c_L^*(t)-E(n_E(t)n_L^*(t))$, where $n_L^*(t)$ is the complex conjugate value of late IQ sample noise at time instant t and E is an expectation value operator. The signal degradation detector 310 may operable to track the early and late delay differences, ELP(t), by calculating the phase for y(t) via the PLL method. The signal degradation detector 310 may generate a closed-loop multipath test statistic such as, for example, $$\frac{1}{N} \sum_{\tau=0}^{N-1} |ELP(t-\tau)|^\alpha \text{ or } \left| \frac{1}{N} \sum_{\tau=0}^{N-1} ELP(t-\tau) \right|^\alpha,$$

where the parameter N is the number of IQ samples within the observation interval for the received GNSS signals, and the parameter $\alpha$ is a preset value. In instances where the closed-loop multipath test statistic is greater than and/or equal to a multipath threshold value, which may be a preset or dynamically determined threshold value, the signal degradation detector 310 may declare signal degradation effects in the received GNSS signals. Otherwise, no signal degradation effects in the received GNSS signals may be declared or indicated.

In various exemplary embodiments of the invention, the signal degradation detector 310 may be operable to generalize the early and late delays to two or more delays for multipath detection. In this regard, the IQ samples may be utilized to form or generate an inter-delay vector. The early and late delays may be generalized to two or more delays. For example, it may be assumed that $c_i(t)$, i=1, . . . , M are the outputs of the correlators 308_1 through 308_M. The inter-delay vector, denoted as $\overline{C}(t)$, may be generated as $\overline{C}(t)=[c_1(t), c_2(t), \ldots, c_M(t)]^T$, where T is a transpose operator. The signal degradation detector 310 may be configured to coherently sum $\hat{C}(t)\overline{C}^H(t)$, the inter-delay matrix of $\overline{C}(t)$, over an observation interval of the received GNSS signals, where H is a complex transpose operator. The average coherent sum of $\hat{C}(t)\overline{C}^H(t)$ may be utilized to generate a correlation matrix, R, as $$R = \frac{1}{N}\sum_{t=1}^{N} \overline{C}(t)\overline{C}^H(t),$$

where N is the number of IQ samples within the observation interval of the received GNSS signals. Variations in magnitude and/or carrier phase over diagonal and off-diagonal elements of the correlation matrix R may provide a discriminator for signal degradation effects in the received GNSS signals. In this regard, the signal degradation detector 310 may be configured to jointly test variations in magnitude and/or carrier phase over diagonal and off-diagonal elements of the correlation matrix R to determine whether signal degradation effects may occur in the received GNSS signals. For example, variations in magnitude and/or carrier phase over the diagonal and off-diagonal elements of the correlation matrix R may be compared and/or evaluated. In instances where the variations in magnitude and/or carrier phase over the diagonal and off-diagonal elements of the correlation matrix R are greater than a threshold value, which may be a preset or dynamically determined threshold value, the signal degradation detector 310 may declare that signal degradation effects occur in the received GNSS signals. Otherwise, no signal degradation effects in the received GNSS signals may be declared or indicated.

In an exemplary operation, the GNSS RF front-end 302 may be operable to receive GNSS signals from the GNSS satellites 132-136, for example. The received GNSS signals may be converted to corresponding GNSS baseband signals for GNSS baseband processing. The GNSS baseband 304 may be operable to process the received GNSS baseband signals for signal degradation detection in the received GNSS signals. The correlation unit 308 may be operable to concurrently perform correlation processing on the processed GNSS baseband signals via the correlators 308_1 through 308_M. The signal degradation detector 310 may utilize the resulting IQ samples to generate a plurality of inter-delay products. The signal degradation detector 310 may be operable to utilize the inter-delay products to calculate either an open loop or a close loop estimate of inter-delay phase coherence for the received GNSS signals. An open-loop multipath test statistic or a closed-loop multipath test statistic may be generated utilizing the corresponding estimate of inter-delay phase coherence for multipath detection. In an embodiment of the invention, the IQ samples at different time delays may be utilized to generate an inter-delay vector as $\overline{C}(t)=[c_1(t), c_2(t), \ldots, c_M(t)]^T$, where $c_i(t)$, i=1, . . . , M are the outputs of the correlators 308_1 through 308_M. The signal degradation detector 310 may be operable to calculate the coherent sum of $\hat{C}(t)\overline{C}^H(t)$ to generate a correlation matrix R as $$R = \frac{1}{N}\sum_{t=1}^{N} \overline{C}(t)\overline{C}^H(t),$$

where N is number of IQ samples within the observation interval of the received GNSS signals. Variations in magnitude and/or carrier phase over the correlation matrix R may be jointly tested to detect or determine signal degradation effects in the received GNSS signals. For example, the signal degradation detector 310 may perform a joint test on variations in magnitude and/or carrier phase over diagonal and off-diagonal elements of the correlation matrix R. In instances where the variations in magnitude and/or carrier phase over the diagonal and off-diagonal elements of the correlation matrix R are greater than a threshold value, which may be a preset or dynamically determined threshold value, signal degradation effects in the received GNSS signals may be declared. Otherwise, the signal degradation detector 310 may indicate or declare that no signal degradation effects may occur in the received GNSS signals.

Figure 4:
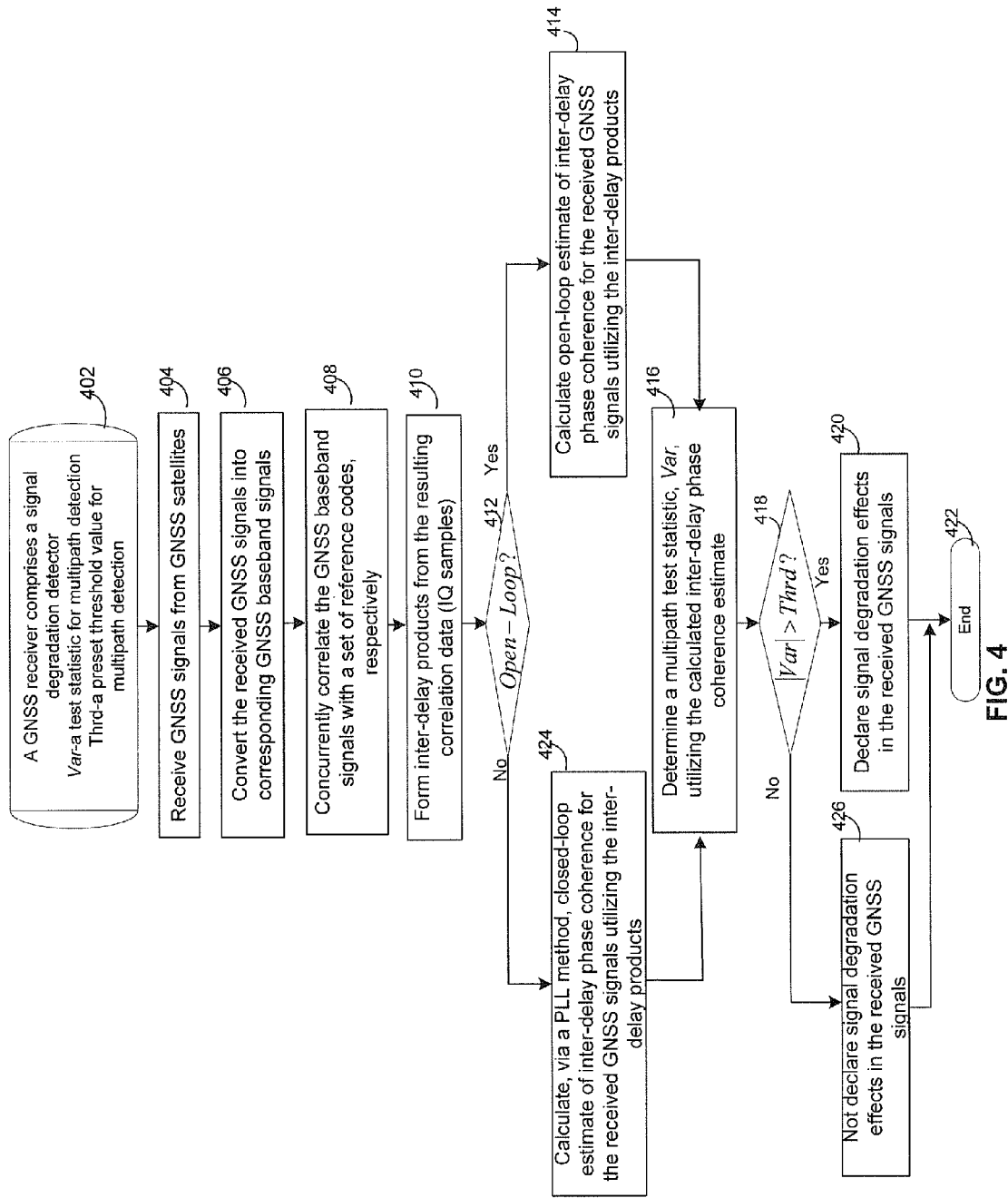
FIG. 4 is a block diagram illustrating exemplary steps that may be performed by a GNSS receiver to generate inter-delay products to calculate an open-loop or closed-loop inter-delay phase coherence estimate for received GNSS signals for multipath detection in the received GNSS signals, in accordance with an embodiment of the invention.

FIG. 4 is a block diagram illustrating exemplary steps that may be performed by a GNSS receiver to generate inter-delay products to calculate an open-loop or closed-loop inter-delay phase coherence estimate for received GNSS signals for multipath detection in the received GNSS signals, in accordance with an embodiment of the invention. Referring to FIG. 4, the exemplary steps may start with step 402. In step 402, a GNSS receiver such as the GNSS receiver 300 comprises a signal degradation detector such as the signal degradation detector 310 for multipath detection in received GNSS signals. The parameter Var represents a test statistic for multipath detection and the parameter Thrd is a preset or dynamically determined threshold value for multipath detection. In step 404, the GNSS RF front-end 302 may be operable to receive GNSS signals from the GNSS satellites 132-136, for example. In step 406, the GNSS RF front-end 302 may be operable to convert the received GNSS signals to corresponding GNSS baseband signals for baseband processing. In step 408, the correlation unit 308 may be configured to concurrently correlate, via the correlators 308_1 through 308_M, the processed GNSS baseband signals with each of a set of reference GNSS acquisition codes, respectively. The set of reference GNSS acquisition codes may be generated for different time delays and provided by the reference code generator 306. In step 410, the resulting correlation data (IQ samples) may be utilized to generate a plurality of inter-delay products. In step 412, it may be determined whether an open-loop or a closed-loop estimate may be implemented for calculating inter-delay phase coherence for the received GNSS signals. In instances where an open-loop estimate may be implemented for calculating the inter-delay phase coherence estimate for the received GNSS signals, then in step 414, the signal degradation detector 310 may be operable to calculate open-loop estimate of inter-delay phase coherence for the received GNSS signals utilizing the inter-delay products. In step 416, the signal degradation detector 310 may determine or select a multipath test statistic Var utilizing the calculated inter-delay phase coherence estimate. In step 418, it may be determined whether the multipath test statistic Var greater than the threshold value Thrd. In instances where the multipath test statistic Var is greater than the threshold value Thrd, then control passes to step 420. In step 420, the signal degradation detector 310 may declare signal degradation effects in the received GNSS signals. The exemplary steps may end in step 422.

In step 412, in instances where a closed-loop estimate may be implemented for calculating the inter-delay phase coherence estimate for the received GNSS signals, then in step 424, the signal degradation detector 310 may be operable to calculate closed-loop estimate of inter-delay phase coherence, via a PLL method, for the received GNSS signals utilizing the inter-delay products. The exemplary steps may proceed in step 416.

In step 418, in instances where the multipath test statistic Var is not greater than the threshold value Thrd, then control passes to step 426. In step 426, the signal degradation detector 310 may not declare signal degradation effects in the received GNSS signals. The exemplary steps may end in step 422.

Figure 5:
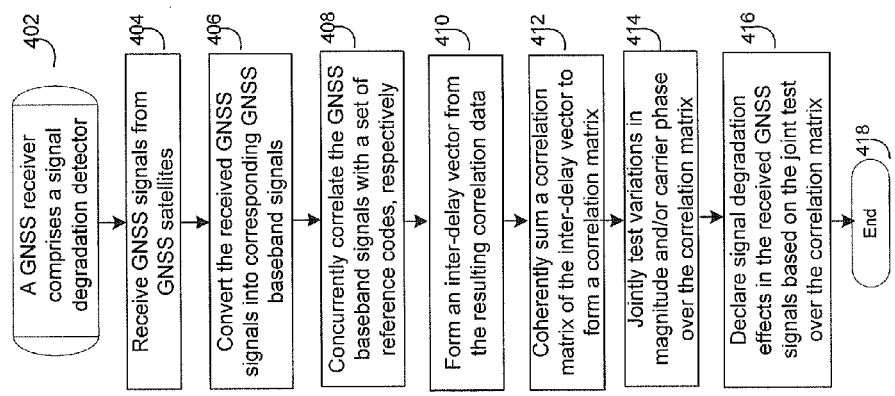
FIG. 5 is a block diagram illustrating exemplary steps that may be performed by a GNSS receiver to detect signal degradation in received GNSS signals, in accordance with an embodiment of the invention.

FIG. 5 is a block diagram illustrating exemplary steps that may be performed by a GNSS receiver to detect signal degradation in received GNSS signals, in accordance with an embodiment of the invention. Referring to FIG. 5, the exemplary steps may start with step 502. In step 502, a GNSS receiver such as the GNSS receiver 300 comprises a signal degradation detector such as the signal degradation detector 310. In step 504, the GNSS RF front-end 302 may be operable to receive GNSS signals from the GNSS satellites 132-136, for example. In step 506, the GNSS RF front-end 302 may be operable to convert the received GNSS signals to corresponding GNSS baseband signals for baseband processing. In step 508, the correlation unit 308 may be configured to concurrently correlate, via the correlators 308_1 through 308_M, the processed GNSS baseband signals with each of a set of reference GNSS acquisition codes, respectively. The set of reference GNSS acquisition codes may be generated for different time delays and provided by the reference code generator 306.

In step 510, the signal degradation detector 310 may be operable to generate an inter-delay vector as $\overline{C}(t) = [c_1(t), c_2(t), \ldots, c_M(t)]^T$, where $c_i(t)$, $i=1, \ldots, M$ are the outputs of the correlators 308_1 through 308_M. In step 512, the signal degradation detector 310 may calculate a coherent sum of $\hat{C}(t)\overline{C}^H(t)$ to generate a correlation matrix R as $$R = \frac{1}{N}\sum_{t=1}^{N} \overline{C}(t)\overline{C}^H(t),$$

where N is the number of IQ samples within the observation interval of the received GNSS signals. In step 514, the signal degradation detector 310 may be operable to perform a joint test on variations in magnitude and/or carrier phase over the correlation matrix R. In step 516, the signal degradation detector 310 may declare that signal degradation effects in the received GNSS signals occur if variations in magnitude and/or carrier phase over elements of the correlation matrix R are greater than a threshold value. Otherwise, no signal degradation effects in the received GNSS signals may be declared or detected. The exemplary steps may end in step 518.

Figure 6:
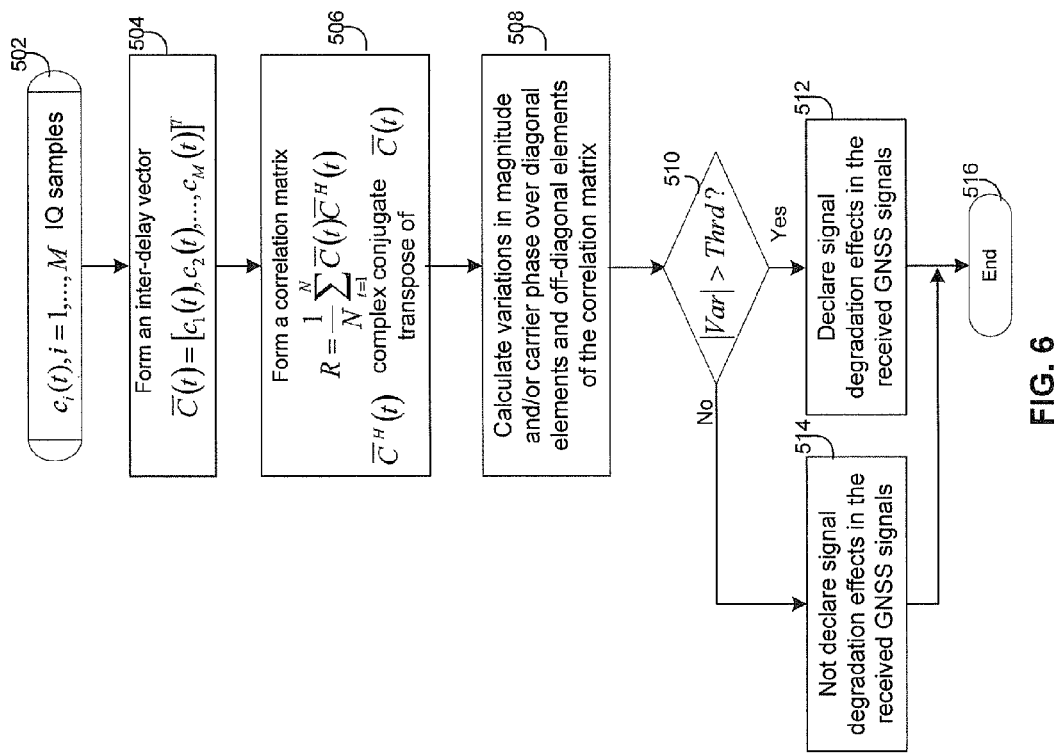
FIG. 6 is a block diagram illustrating exemplary steps that may be performed by a GNSS receiver to calculate a correlation matrix to detect signal degradation in received GNSS signals, in accordance with an embodiment of the invention.

FIG. 6 is a block diagram illustrating exemplary steps that may be performed by a GNSS receiver to calculate a correlation matrix to detect signal degradation in received GNSS signals, in accordance with an embodiment of the invention. Referring to FIG. 6, the exemplary steps may start with step 602. In step 602, $c_i = 1, \ldots, M$ may represent output data of the correlators 308_1 through 308_M. In step 604, the signal degradation detector 310 may generate an inter-delay vector as $\overline{C}(t) = [c_1(t), c_2(t), \ldots, c_M(t)]^T$. In step 608, a correlation matrix R may be generated as $$R = \frac{1}{N}\sum_{t=1}^{N} \overline{C}(t)\overline{C}^H(t),$$

where $\overline{C}^H(t)$ is the complex conjugate transpose of $\overline{C}(t)$, and N is the number of IQ samples within the observation interval of the received GNSS signals. In step 610, the signal degradation detector 310 may be operable to calculate variations in magnitude and/or carrier phase over diagonal elements and off-diagonal elements of the correlation matrix R. In step 610, it may be determined whether the calculated variations greater than a threshold value. In instances where the calculated variations are greater than a threshold value, then control passes to step 612. In step 612, the signal degradation detector 310 may declare signal degradation effects in the received GNSS signals. The exemplary steps may end in step 616.

In step 610, in instances where the calculated variations are not greater than a threshold value, then control passes to step 614. In step 614, the signal degradation detector 310 may not declare signal degradation effects in the received GNSS signals. The exemplary steps may end in step 616.

In various exemplary aspects of the method and system for inter-delay product test for signal degradation detection in a GNSS receiver, a GNSS enabled communication device such as the GNSS enabled communication device 200 may be operable to receive GNSS satellite signals from the GNSS satellites 132-136, for example. The correlation unit 310 may be configured to concurrently correlate, via the correlators 308_1 through 308_M, corresponding GNSS baseband signals of the received GNSS signals with a plurality of GNSS acquisition codes from the reference code generator 306. The signal degradation detector 310 may be operable to utilize the resulting correlation IQ samples to generate a plurality of inter-delay products. The signal degradation detector 310 may utilize the inter-delay products for multipath detection for the received GNSS signals. In this regard, the signal degradation detector 310 may utilize the inter-delay products to generate either an open loop or a close-loop estimate of inter-delay phase coherence for the received GNSS signals. A PLL method may be utilized for calculating the inter-delay phase coherence estimate. The inter-delay phase coherence estimate may be utilized to generate a test statistic selected for the multipath detection on the received GNSS signals. The selected test statistic may be compared with a threshold value, which may be a preset or dynamically determined threshold value. In instances where the selected test statistic is greater than the threshold value, the signal degradation detector 310 may declare signal degradation effects in the received GNSS signals. Otherwise, no signal degradation effects in the received GNSS signals may be declared or indicated. In an exemplary embodiment of the invention, the signal degradation detector 310 may generalize the early and late delays to two or more delays for multipath detection. In this regard, the IQ samples may be utilized to form or generate a correlation matrix R. The signal degradation detector 310 may coherently sum the correlation matrix R over an observation interval of the received GNSS signals. The signal degradation detector 310 may be operable to compare or evaluate the variations over the summed correlation matrix with the threshold value. In instances where the variations are greater than the threshold value, the signal degradation detector 310 may declare signal degradation effects in the received GNSS signals. Otherwise, no signal degradation effects in the received GNSS signals may be declared or indicated.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for inter-delay product test for signal degradation detection in a GNSS receiver.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
in a Global Navigation Satellite Systems (GNSS) enabled communication device:
receiving GNSS satellite signals from a plurality of GNSS satellites;
concurrently correlating corresponding GNSS baseband signals of said received GNSS signals with a plurality of reference GNSS acquisition codes;
generating a plurality of inter-delay products utilizing correlation samples from said concurrent correlation; and
detecting signal degradation in said received GNSS signals utilizing said plurality of inter-delay products.

2. The method according to claim 1, comprising generating an open-loop or a closed-loop estimate of inter-delay phase coherence utilizing said plurality of inter-delay products for said received GNSS satellite signals.

3. The method according to claim 2, comprising utilizing a phase lock loop (PLL) method for said closed-loop estimate of inter-delay phase coherence.

4. The method according to claim 3, comprising generating a test statistic utilizing said open-loop estimate or said closed-loop estimate.

5. The method according to claim 4, comprising comparing said test statistic with a threshold value.

6. The method according to claim 5, comprising declaring said signal degradation in said received GNSS satellite signals based on said comparison.

7. The method according to claim 1, comprising generating a correlation matrix utilizing said correlation samples from said concurrent correlation.

8. The method according to claim 7, comprising coherently average summing said correlation matrix over an observation interval of said received GNSS signals.

9. The method according to claim 8, comprising jointly testing variations over said summed correlation matrix.

10. The method according to claim 9, comprising identifying said signal degradation in said received GNSS satellite signals based on said jointly testing.

11. A system for communication, the system comprising:
one or more processors and/or circuits for use in a Global Navigation Satellite Systems (GNSS) enabled communication device, said one or more processors and/or circuits being operable to:
receive GNSS satellite signals from a plurality of GNSS satellites;
concurrently correlate corresponding GNSS baseband signals of said received GNSS signals with a plurality of reference GNSS acquisition codes;
generate a plurality of inter-delay products utilizing correlation samples from said concurrent correlation; and
detect signal degradation in said received GNSS signals utilizing said plurality of inter-delay products.

12. The system according to claim 11, wherein said one or more processors and/or circuits are operable to generate an open-loop or a closed-loop estimate of inter-delay phase coherence utilizing said plurality of inter-delay products for said received GNSS satellite signals.

13. The system according to claim 12, wherein said one or more processors and/or circuits are operable to utilize a phase lock loop (PLL) method for said closed-loop estimate of inter-delay phase coherence.

14. The system according to claim 13, wherein said one or more processors and/or circuits are operable to generate a test statistic utilizing said open-loop estimate or said closed-loop estimate.

15. The system according to claim 14, wherein said one or more processors and/or circuits are operable to compare said test statistic with a threshold value.

16. The system according to claim 15, wherein said one or more processors and/or circuits are operable to declare said signal degradation in said received GNSS satellite signals based on said comparison.

17. The system according to claim 11, wherein said one or more processors and/or circuits are operable to generate a correlation matrix utilizing said correlation samples from said concurrent correlation.

18. The system according to claim 17, wherein said one or more processors and/or circuits are operable to coherently average sum said correlation matrix over an observation interval of said received GNSS signals.

19. The system according to claim 18, wherein said one or more processors and/or circuits are operable to jointly test variations over said summed correlation matrix.

20. The system according to claim 19, wherein said one or more processors and/or circuits are operable to identify said signal degradation in said received GNSS satellite signals based on said jointly testing.

* * * * *